June 16, 1936.  W. D. MORGAN  2,044,624
COMBINED PULLING, PICKING-UP, AND TRANSPORTING ATTACHMENT FOR EXCAVATORS
Filed Sept. 27, 1935   3 Sheets-Sheet 1
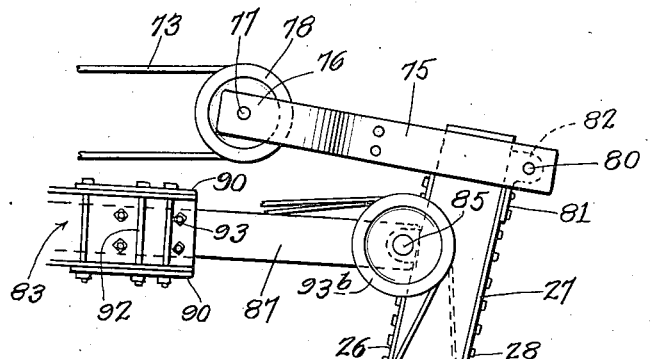
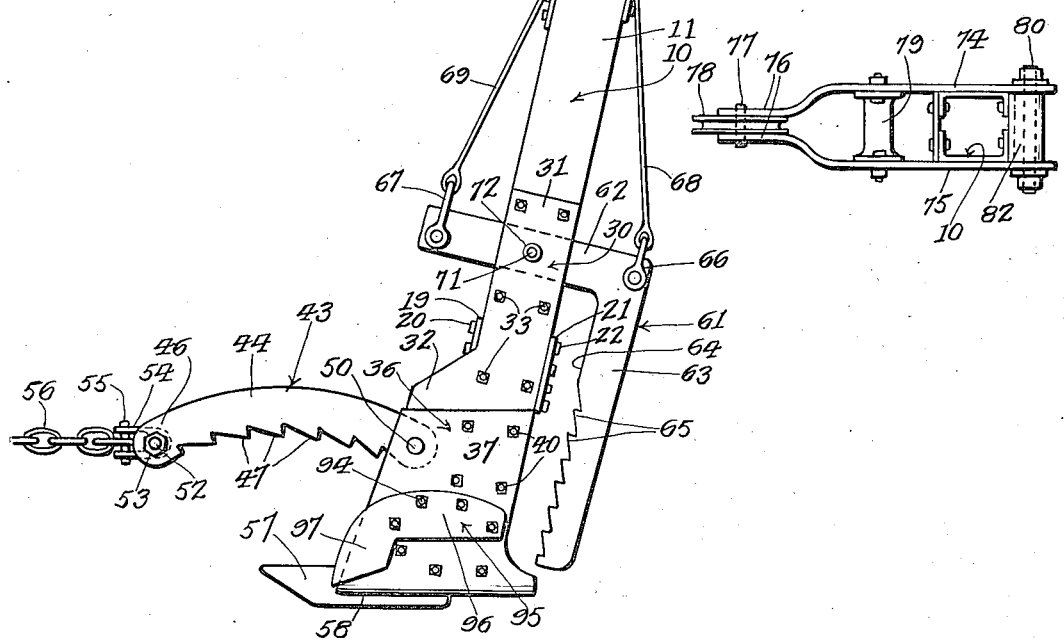
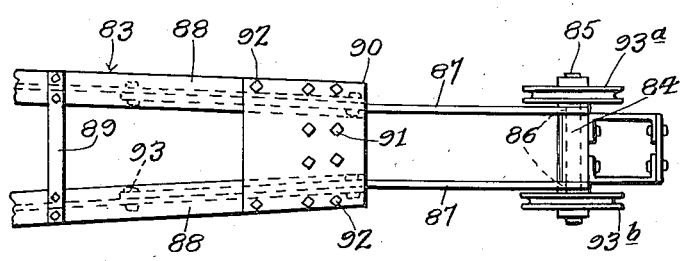
Inventor
Walter D. Morgan
By Geo. P. Kimmel
Attorney

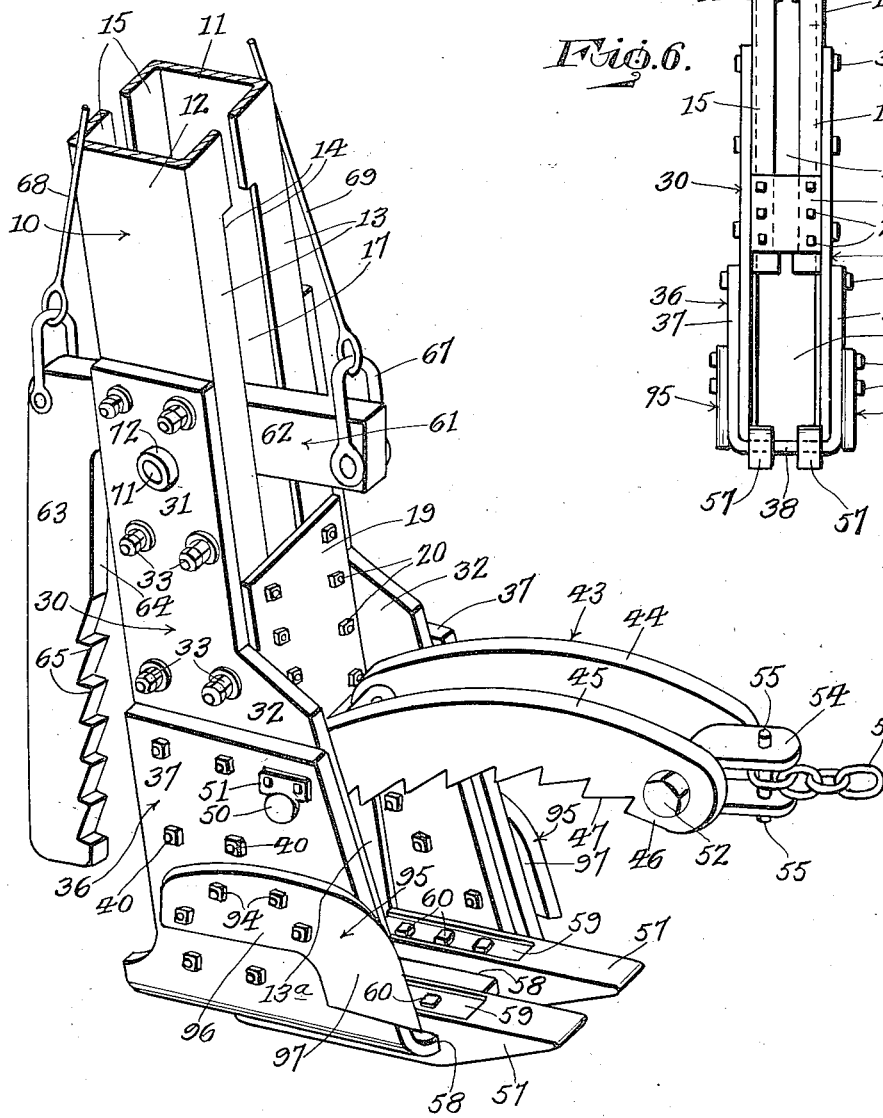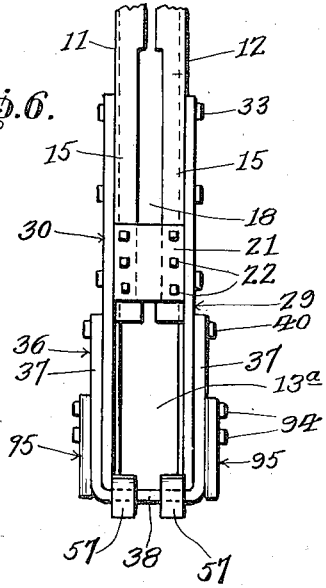

June 16, 1936.  W. D. MORGAN  2,044,624

COMBINED PULLING, PICKING-UP, AND TRANSPORTING ATTACHMENT FOR EXCAVATORS

Filed Sept. 27, 1935  3 Sheets-Sheet 3

Inventor
Walter D. Morgan
By
Geo. P. Kimmel
Attorney

Patented June 16, 1936

2,044,624

UNITED STATES PATENT OFFICE 2,044,624

COMBINED PULLING, PICKING-UP, AND TRANSPORTING ATTACHMENT FOR EXCAVATORS

Walter D. Morgan, Ladysmith, Wis.

Application September 27, 1935, Serial No. 42,531

7 Claims. (Cl. 214—138)

This invention relates to a combined pulling, picking-up and transporting attachment for employment in connection with excavators of the drag shovel or trench hoe type. The attachment is to be substituted for the shovel of the excavator for the purpose of clearing land of obstructions.

The object of the invention is to provide, in a manner as hereinafter set forth, a land clearing attachment operated from an excavator of the type referred to for the purpose of pulling stumps, taking out boulders and rocks and uprooting trees, as well as for picking up the pulled stumps, the removed boulders or rocks, the uprooted trees and transporting them from a point in close proximity to the excavator to the point desired as well as arranging them, when transported in windrows or piles.

Further objects of the invention are to provide, in a manner as hereinafter set forth, an attachment for the purpose referred to which is comparatively simple in its construction and arrangement, readily installed with respect to the boom and operating cables of the excavator of the type aforesaid, conveniently controlled, thoroughly efficient in its use, strong, durable, compact and comparatively inexpensive to manufacture.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications may be resorted to which fall within the scope of the invention as claimed.

In the drawings:

Figure 1 is a side elevation of the attachment connected to the boom of the excavator, Figure 2 is a fragmentary view in perspective of the attachment looking towards the front thereof, Figure 3 is a view similar to Figure 2 looking towards the back of the attachment, Figure 4 is a top plan view of the top coupling structure employed for connecting the attachment to a shifting cable therefor, Figure 5 is a top plan view of the lower coupling structure employed for pivotally connecting the attachment to the boom of the excavator, Figure 6 is a fragmentary view in rear elevation of the attachment, Figure 7 is a sectional detail illustrating the form of teeth employed at the bottom of the attachment, Figure 8 is a sectional plan showing the pickup element and the pivot for the latter, and Figure 9 is a sectional plan showing the pull element and the pivot therefor.

The attachment includes a standard 10 formed of a pair of oppositely disposed spaced inwardly opening upstanding channel irons 11, 12 having their front flanges 13 cut out as at 14 and their rear flanges 15 cut out as at 16 to form wide clearances 17 and 18 at the front and back respectively of the standard 10 for a purpose to be referred to. The flanges 13, 14 are of less length than the channel irons and have their lower ends positioned a substantial distance above the lower ends of the channel irons to provide clearance 13ª at the lower portion of the front and rear of the standard for the passage through the latter of small roots and dirt. The channel irons 11, 12 are connected together adjacent their lower ends by a front plate 19 and holdfast means 20. The plate 19 is anchored to the front flanges 13. The channel irons 11, 12 are also connected together adjacent their lower ends by a rear plate 21 and holdfast means 22. The plate 21 is anchored to the rear flanges 15. The rear flanges 15 are formed with semi-circular cutouts 23 in proximity to their lower ends to form the back of standard 10 with a large substantially circular clearance 24. The channel irons 11, 12 are connected together adjacent their upper ends by a front plate 25 and holdfast means 26. The plate 25 is anchored to the front flanges 13. The channel irons 11, 12 are also connected together adjacent their upper ends by a rear plate 27 and holdfast means 28. The plate 27 is anchored to the rear flanges 15. Arranged against the outer faces of the sides of the channel irons 11, 12 are vertically disposed reinforcing members 29, 30 respectively of plate like form provided with a narrow upper part 31 and a wide lower part 32. The parts 31 are flush with the flanges 13, 15. The parts 32 are flush with the flanges 15 and extend forwardly relative to the flanges 13. The lower ends of the members 29, 30 are flush with the lower ends of the channel irons. The parts 31 and the upper portion of the parts 32 are anchored to the channel irons by the holdfast devices 33. The parts 31 are formed with openings 34 which register with openings 35 provided in the sides of the channel irons.

The standard 10 includes a foot piece 36 of yoke-shaped form having a pair of sides 37 and a bottom 38. The sides 37 are arranged against the outer faces of the parts 32 of the members 29, 30. The bottom 38 is arranged below and abuts lower ends of the channel irons and members 29, 30. The lower portion of foot piece 36 extends rearwardly from the channel irons and the reinforcing members. The sides 37 of the foot piece 36, the channel irons and the reinforcing members are anchored together in abutting relation by the holdfast devices 40. The sides 37 of member 36 and the reinforcing members 29, 30 are provided with registering openings. The openings in the sides 37 are designated 41 and those in the reinforcing members at 42.

The attachment includes a pulling element 43 comprising a pair of spaced parallel arms 44, 45 of arcuate contour and of like form. The arms are disposed at right angles to and extend forwardly from the standard 10. Each arm has its lower lengthwise extending edge 46 formed with a row of gripping teeth 47. Each arm is disposed upon its edge 46 and is formed at its inner and outer end with transverse openings 48, 49 respectively. The openings of the arm 44 align with the openings of the arm 45. The inner ends of the arms 44, 45 are arranged between the parts 32 of the members 29, 30. The openings 48 align with the openings 41, 42. Extending through the aligned openings 41, 42, 49 is a pivot shaft 50 for the pulling element 43. The shaft 50 projects beyond an arm 37 of foot-piece 36 and such arm carries a stop 51 which extends into the top of shaft 50 to prevent the lengthwise shifting of the latter. Extending through the openings 49 in the arms 44, 45 is a headed bolt 52 carrying on its end a securing nut 53 which abuts the outer face of the arms 45. Mounted on the bolt 52 between the arms 44, 45 is a yoke-shaped hitch 54 provided with a coupling pin 55 for connecting a pull member 56 to the pulling element 43. The member 56 is in the form of a chain which winds on and off of a rotatable drum, not shown, carried by the body of the excavator.

Arranged at the lower end of the standard 10 is a pair of spaced parallel digger teeth 57 which extend forwardly from the front of the bottom 38 of the foot piece 36. The teeth 53 are formed with lengthwise extending parallel grooves 58 opening at the rear end of the teeth and providing for the passage of the bottom 38 of the foot piece 36. The upper faces of the teeth 57 are mortised as at 59. Engaging with the teeth 57 and extending through the bottom 38 of foot piece 36 are headed holdfast devices 60 which anchor the teeth 57 stationary to the foot piece 36. The teeth depend below the foot pieces. The heads of the holdfast devices 60 are arranged in the mortises 59.

The attachment includes a pick-up element 61 of angle-shape. The element 61 is formed of an upper horizontally disposed arm 62 and a vertically disposed rear arm 63 depending from the rear end of arm 62. The inner side edge 64 of arm 63 is provided with a row of teeth 65. The ends of arms 62 have pivotally connected therewith upstanding coupling members 66, 67 to which are attached pulling cables 68, 69 respectively operated by a reversible drum, not shown, carried by the body of the excavator. The arm 62 centrally thereof is formed with an opening 70 through which extends a pivot shaft 71 for the arm. The arm 62 passes through the clearances 17 and 18 and extends from the flanges 13 and 15. The shaft 71 extends beyond the sides of the standard 10 and passes through the openings 34, 35. Mounted on the shaft 71, abutting the sides of arm 62 and extending through the openings 34, 35 are bearing sleeves 72. The attachment includes an upper coupling structure (Figure 4) for connecting the standard 10 to a cable 73 which is operated from means, not shown on the body of the excavator and functions to elevate and lower the lower end portion of the standard. The said upper coupling structure includes a pair of spaced parallel side members 74, 75 arranged and clamped against the sides of the upper ends of and extending rearwardly and forwardly with respect to the channel irons 11, 12. The members 74, 75 having inset front portions 76 which carry a shaft 77 for a pulley 78 around which travels the cable 73. Arranged between and anchored to the members 74, 75 intermediate the end of the latter is a yoke-shaped brace and coupler 79. Secured to and extending transversely of the forward ends of the members 74, 75 is a bolt 80. Anchored to the plate 27 is an upstanding arm 81 provided at its upper end with a barrel 82 arranged between the members 74, 75. The bolt 80 extends through the barrel 82.

The standard 10 is carried by and pivotally connected in proximity to its upper end with the outer end of the boom 83 of the excavator by a lower coupling structure (Figure 5) consisting of a bearing 84 anchored to the flanges 13 of the channel irons below and in proximity to the members 74, 75. Extending through and projecting from each end of the bearing 84 is a pivot shaft 85 which also extends through openings 86 formed in the inner ends of a pair of spaced parallel arms 87 arranged at the ends of bearing 84. The boom 83 includes a pair of spaced opposed I-beams 88 connected together by upper and lower coupling bars 89 anchored to the I-beams 88. Only the upper bar 89 is shown. Positioned against the top and bottom of the I-beams 88, at their upper ends thereof are coupling plates 90 anchored together by tie-bolts 91 and also anchored to the flanges of the beams 88 by tie-bolts 92 which extend through the plates 90 and flanges of the beams. The arms 87 extend into the upper or outer end of the boom 83 and are positioned against the inner side faces of the webs of the beams. The arms 87 are anchored to the beams by holdfast means 93 extending through said arms and webs of the beams. The pivot shaft 85 is provided on each end with a grooved pulley outwardly adjacent each arm 87. The pulleys are designated 93ª and 93ᵇ and over which travel the cables 68, 69 respectively.

Anchored by the holdfast devices 93ᶜ to each side 37 of the foot piece 36 is an angle shaped cutter 95 formed of a horizontal arm 96 and a vertical arm 97 depending from the forward end of arm 96. The arms 97 project beyond the forward side edges of the sides 37, and extend in close proximity to the bottom 38 of the foot piece 36.

An example of the manner in which the attachment acts when pulling a stump and transporting the latter to the point desired will now be referred to. It will be assumed that the standard has been raised by the cable 73 and swung over back of stump and cable 73 released, then by pulling in the chain 56, the lower portion of the standard moves towards the stump and on a continued pull in of chain 56, the stump or parts of it are torn out by the cutters and teeth 57 and on a further pull in of chain 56, the stump or its roots are caught between element 43 and teeth 57. In this position the stump or its parts may be swung to one side of the excavator and by releasing chain 56 the stump or its parts drop out from between element 43 and teeth 57. If the stump has not been completely removed, the foregoing operation will be repeated until it is.

It is often desired that the pulled stumps be placed in windrows or piles, but that the grip on the stump by element 43 and teeth 57 is not positive, and further when releasing the cable 73 the stump drops close to the machine. To provide for picking up and transporting the pulled stump, after it has been released to the point desired the element 61 is employed. By taking up on line or cable 68, the element 61 is opened up. The attachment is then swung over the stump to be picked up and then by taking up on line or cable 69 the stump is then held against the back of standard 10. In this position, as long as strain remains on line or cable 69, either by brake or drum, the stump is then elevated and transported to the desired point by the taking up of cable 73 and the action of the latter on the standard 10 and boom 83. When the stump has been shifted to the desired point it is dropped by releasing line or cable 69.

What I claim is:

1. A combined pulling, picking-up and transporting attachment for excavators, comprising a shiftable pivotally suspended standard, digger teeth anchored to, arranged at, depending from and extended forwardly from the bottom of the standard, a pull element pivoted at the inner end to and extended forwardly from the standard, said element having a toothed bottom, a pull member attached to the outer end of said element, and an upper coupling structure secured to the upper portion of the standard for connecting a shifting cable to the latter.

2. In a combined pulling, picking-up and transporting attachment for excavators, a shiftable standard, means for pivotally suspending the standard between its transverse median and its upper end, spaced digger teeth carried by and extending forwardly from the lower end of the standard, a pair of laterally extendible spaced parallel arms of arcuate form disposed on a lengthwise edge and having such edge toothed, means for connecting the outer ends of said arms together and for coupling them to a pulling cable, and means for connecting the inner ends of said arms together and for pivotally supporting said inner ends from the standard.

3. In a combined pulling, picking-up and transporting attachment for excavators, a shiftable standard, means for pivotally suspending the standard between its transverse median and its upper end, spaced digger teeth carried by and extending forwardly from the lower end of the standard, a pair of laterally extendible spaced parallel arms of arcuate form disposed on a lengthwise edge and having such edge toothed, means for connecting the outer ends of said arms together and for coupling them to a pulling cable, and means for connecting the inner ends of said arms together and for pivotally supporting said inner ends from the standard, and cutters secured to the sides of and extending forwardly from said standard, said cutters arranged in proximity to said teeth.

4. In an attachment for the purpose set forth a shiftable pivotally suspended standard, means at the upper end of said standard for connecting a shifting cable thereto, and a pick-up element of angle form having a horizontal part extending through and projecting forwardly and rearwardly from the front and rear of the standard and a vertical part depending from the rear end of and of greater length than said horizontal part, said vertical arm opposing the rear of said standard, means carried by the standard and coacting with said horizontal part for pivotally suspending said element, and means at the ends of said horizontal part for coupling a pair of shifting cables for said element.

5. In an attachment for the purpose set forth a shiftable pivotally suspended standard, means at the upper end of said standard for connecting a shifting cable thereto, a pick-up element of angle form having a horizontal part extending through and projecting forwardly and rearwardly from the front and rear of the standard and a vertical part depending from the rear end of and of greater length than said horizontal part, said vertical arm opposing the rear of said standard, means carried by the standard and coacting with said horizontal part for pivotally suspending said element, means at the ends of said horizontal part for coupling a pair of shifting cables for said element, and a structure for coupling said standard to the boom of an excavator, said structure including the pivot for said standard, said pivot being provided with pulleys over which travel the pair of shifting cables.

6. In an attachment for the purpose set forth a shiftable pivotally suspended standard, means at the upper end of said standard for connecting a shifting cable thereto, and a pull element formed of a pair of spaced parallel arms of arcuate form, each being disposed on its lower lengthwise edge, said edge being toothed, means for connecting the outer ends of said arms together and for connecting to said element a pulling cable therefor, and means for pivotally connecting the inner ends of said arms to said standard, said arms for extending forwardly from said standard on the operation of said element.

7. In an attachment for the purpose set forth a shiftable pivotally suspended standard, means at the upper end of said standard for connecting a shifting cable thereto, a pull element formed of a pair of spaced parallel arms of arcuate form, each being disposed on its lower lengthwise edge, said edge being toothed, means for connecting the outer ends of said arms together and for connecting to said element a pulling cable therefor means for pivotally connecting the inner ends of said arms to said standard, said arms for extending forwardly from said standard on the operation of said element, and a structure for coupling said standard to the boom of an excavator, said structure including the pivot for said standard, said pivot being provided with a pulley over which travels the shifting cable.

WALTER D. MORGAN.